United States Patent [19]

Lazarus

[11] Patent Number: 4,965,081

[45] Date of Patent: Oct. 23, 1990

[54] DRY MIX SUITABLE FOR THE PREPARATION OF A PUFFABLE FOOD PRODUCT, PROCESSES FOR THE USE THEREOF, AND THE PUFFABLE AND/OR PUFFED FOODS PRODUCTS SO PRODUCED

[75] Inventor: Charles R. Lazarus, Kitchawan, N.Y.

[73] Assignee: Haarmann & Reimer Corporation, Springfield, N.J.

[21] Appl. No.: 265,737

[22] Filed: Nov. 1, 1988

[51] Int. Cl.$^5$ .................. A21D 10/00; A23D 1/00
[52] U.S. Cl. .................. 426/242; 426/445; 426/449; 426/549; 426/550; 426/559
[58] Field of Search ............ 426/549, 550, 559, 560, 426/445, 449, 242

[56] References Cited

U.S. PATENT DOCUMENTS

| | | | |
|---|---|---|---|
| 2,665,214 | 1/1954 | Scott | 99/81 |
| 3,220,852 | 11/1965 | Gerkens et al. | 99/100 |
| 3,451,822 | 6/1969 | Fast et al. | 99/100 |
| 3,506,454 | 4/1970 | Reesman | 99/81 |
| 3,600,193 | 8/1971 | Glabe et al. | 99/83 |
| 3,652,294 | 3/1972 | Marotta et al. | 99/83 |
| 3,656,966 | 4/1972 | Ball et al. | 99/83 |
| 3,666,511 | 5/1972 | Williams et al. | 106/210 |
| 3,703,378 | 11/1972 | Bretch | 99/81 |
| 3,703,379 | 11/1972 | Cummisford et al. | 99/81 |
| 3,753,729 | 8/1973 | Harms et al. | 99/82 |
| 3,753,735 | 8/1973 | Gerkens | 99/100 |
| 3,800,050 | 3/1974 | Popel | 426/343 |
| 3,849,582 | 11/1974 | Biagdon et al. | 426/152 |
| 3,886,291 | 5/1975 | Willard | 426/637 |
| 3,904,429 | 9/1975 | Eastman et al. | 127/71 |
| 3,922,370 | 11/1975 | Prakash | 426/559 |
| 3,925,567 | 12/1975 | Abe | 426/559 |
| 3,966,990 | 6/1976 | Cremer et al. | 426/550 |
| 3,978,244 | 8/1976 | Sair | 426/580 |
| 4,251,551 | 2/1981 | VanHulle et al. | 426/94 |
| 4,259,359 | 3/1981 | Spicer | 426/62 |
| 4,262,028 | 4/1981 | Meyer et al. | 426/417 |
| 4,409,250 | 10/1983 | VanHulle et al. | 426/242 |
| 4,455,321 | 6/1984 | Globe et al. | 426/808 |
| 4,517,204 | 5/1985 | Mottur et al. | 426/94 |
| 4,734,289 | 3/1988 | Yamaguchi et al. | 426/302 |
| 4,752,493 | 6/1988 | Moriki | 426/559 |
| 4,770,891 | 9/1988 | Willard | 426/559 |
| 4,869,911 | 9/1989 | Keller | 426/449 |

*Primary Examiner*—Donald E. Czaja
*Assistant Examiner*—Mary S. Mims
*Attorney, Agent, or Firm*—Joseph C. Gil

[57] ABSTRACT

The present invention is directed to a novel composition suitable for the preparation of a puffable food product, and to processes for the use thereof, and to the puffed and/or puffable products so produced. The composition broadly comprises certain native starches, a maltodextrin of a specified dextrose equivalent, and specified modified pregelatinized starches.

18 Claims, No Drawings

DRY MIX SUITABLE FOR THE PREPARATION OF A PUFFABLE FOOD PRODUCT, PROCESSES FOR THE USE THEREOF, AND THE PUFFABLE AND/OR PUFFED FOODS PRODUCTS SO PRODUCED

BACKGROUND OF THE INVENTION

It is known that a wide variety of potato based materials will expand or puff under appropriate conditions and will retain the expanded size upon cooling. See, e.g., U.S. Pat. Nos. 3,506,454, 3,703,378, 3,703,379, 3,753,729, 3,800,050, 3,849,582, 3,904,429, 3,966,990, 4,517,204, and 4,734,289. It is also known to use dried potato flour (U.S. Pat. No. 3,220,852), precooked and dehydrated potatoes (U.S. Pat. No. 3,451,822), pregelatinized potato starch (U.S. Pat. No. 3,652,294), potato flour (U.S. Pat. No. 3,753,735) and cooked potato solids (U.S. Pat. No. 3,886,291).

In addition to potato based materials, the art has also described other materials which can be used to prepare puffed products. Such other materials include corn dough (U.S. Pat. No. 2,665,214); a mixture of corn flour, gelatinized corn flour, and tapioca starch (U.S. Pat. No. 3,600,193); whole wheat or whole rye (U.S. Pat. No. 3,656,966); a mixture of crosslinked starches (U.S. Pat. No. 3,666,511); a mixture of fat and gelatinized rice flour (U.S. Pat. No. 3,922,370); a gelatinous starch (U.S. Pat. No. 3,925,567); a defatted soy protein or casein (U.S. Pat. No. 3,978,244); ground wheat (U.S. Pat. No. 4,259,359); and, a mixture of corn starch and defatted animal parts (U.S. Pat. No. 4,262,028).

The various techniques used to puff the products include frying, hot air heating, and microwave heating. A survey of various techniques used in the art is described in U.S. Pat. Nos. 4,251,551 and 4,409,250.

As is recognized in the art, formulations made primarily for one puffing technique generally do not puff as well using another technique (see U.S. Pat. No. 4,251,551). It would thus be highly desirable to develop a material which would puff under a wide variety of conditions and using a variety of different puffing techniques.

DESCRIPTION OF THE INVENTION

The present invention is directed to the discovery of a formulation which yields puffed products under a variety of conditions using a variety of techniques. The invention is also directed to a process for preparing a puffable product and to the puffable product so produced. Finally, the invention is directed to a method of preparing a puffed food product and to the puffed product so produced.

More particularly, the invention is directed to a dry mix suitable for the preparation of a puffable food product comprising:
(a) from 60 to less than 94.5% by weight of a native starch selected from the group consisting of native potato starch, native corn starch, native wheat starch, and mixtures thereof,
(b) from more than 3 to no more than 9% by weight of native tapioca starch,
(c) from 1 to less than 6% by weight of a maltodextrin having a dextrose equivalent of 20 or less,
(d) from more than 1.5 to less than 3% by weight of a modified pregelatinized starch selected from the group consisting of modified pregelatinized grain starch, modified pregelatinized tuber starch, modified pregelatinized root starch and mixtures thereof, and
(e) a flavoring and/or seasoning ingredient in an amount of from 0 to 15% by weight, said percents by weight totaling 100%.

In the most preferred embodiment, a flavoring ingredient is included in the dry mix in an amount sufficient to provide a flavor to the puffed product. By the term "puffable" is meant the ability of the product to expand in volume upon heating and to retain at least six times the original volume upon cooling. In many cases, the products herein will expand in volume twenty times their original volume.

The process for preparing the puffable product broadly comprises forming the dry mix by mixing the various components, extruding the mix with water in a heated extruder at a rate and temperature such that the mixture exits the extruder as a non-expanded, translucent-to-clear product, cutting the extruded product into the desired shape, and drying the cut product to a degree such that the moisture content is from 5 to 20% by weight. The resultant product may then be stored indefinitely. To puff the product, it need only be subjected to heat in the form of hot air. The product may also be puffed by the application of microwave energy or by frying.

The dry mix of the present invention contains (i) a native starch selected from the group consisting of native potato starch, native corn starch, native wheat starch and mixtures thereof, (ii) native tapioca starch, (iii) maltodextrin, and (iv) a modified pregelatinized starch. The native starches useful herein are generally known in the art. By "native" is meant the substantially pure granular carbohydrate separated from the product with which it occurs in nature. This is to be distinguished from flour which contains certain significant amounts of solids other than starch. Typical properties of such starches are:

|  | potato starch | tapioca starch | corn starch | wheat starch |
|---|---|---|---|---|
| Granule diameter, range ($\mu$m) | 5–100 | 4–25 | 3–26 | 1–40 |
| Average diameter ($\mu$m) | 20 | 20 | 15 | 10 |
| Moisture 65% RH/20° C. | 19 | 13 | 13 | 13 |
| Lipids (% on dry substance) | 0.05 | 0.1 | 0.6 | 0.8 |
| Protein (% on d.s.) | 0.06 | 0.1 | 0.35 | 0.4 |
| Ash (% on d.s.) | 0.4 | 0.2 | 0.1 | 0.2 |
| Phosphorous (% on d.s.) | 0.08 | 0.01 | 0.02 | 0.06 |
| Taste and odor substances | low | low | high | high |
| Amylose content (% on d.s.) | 21 | 17 | 28 | 28 |
| Amylopectin content (% on d.s.) | 79 | 83 | 72 | 72 |

The maltodextrins useful herein are also generally known in the art. Useful maltodextrins and methods of their manufacture are described, for example, in U.S. Pat. Nos. 3,560,343, 3,663,369, 3,849,194 3,974,032, 3,974,033, and 4,298,400, the disclosures of which are herein incorporated by reference. Useful maltodextrins are also described in U.S. Pat. Nos. 4,285,983, 4,560,574, 4,615,892, and 4,734,290. One particularly preferred maltodextrin is Maltrin M100, a maltodextrin commercially available from Grain Processing Corporation, having a dextrose equivalent of from 9.0 to 12.0.

The modified pregelatinized starches are generally known in the art. The modified pregelatinized starches include modified pregelatinized grain, root and/or tuber starches. The modified starches useful include those based on pregelatinized corn starch, pregelatinized waxy maize starch, pregelatinized waxy millet starch, pregelatinized waxy sorghum starch, pregelatinized waxy milo starch, pregelatinized waxy rice starch, pregelatinized potato starch, pregelatinized tapioca starch, and mixtures thereof. Preferred are modified pregelatinized corn and/or waxy maize starches. By "modified" as used herein are meant crosslinked starches. As is known in the art, crosslinked starches are produced by heating a suspension of the pregelatinized starch with a small amount of difunctional chemical, such as epichlorohydrin, phosphorus oxychloride or sodium trimetaphosphate, and an alkaline catalyst. The treated slurry is neutralized, dewatered, washed, and dried. Crosslinking inhibits disintegration of the cooked swollen granules and maintains high viscosity in the presence of shear. One particularly preferred material is X-Pand'R, a commercially available pregelatinized waxy maize starch available from A. E. Staley. Also useful are Crispfilm starch, available from National Starch and Chemical Corporation; Amaizo 721-A and Amaizo 721-AE, both available from American Maize Products; and the modified pregelatinized starches sold by Roquette under the tradename Preflo.

Useful seasonings include salts, such as sodium chloride, monosodium glutamate, sodium dihydrogen phosphate, and the like. In general, seasonings can be defined as salts, or an herb, spice, or the like, for heightening or improving the flavor of food.

Useful flavorings include natural flavorings such as bacon, cheese, lobster, roasted onion, butter, pizza, and artificial flavors. When used, the flavorings are used in an amount sufficient to flavor the puffed product. Typically the amount used will range from about 1 to about 15% by weight.

The amounts of materials in the dry mix are as follows:
(a) native potato, corn and/or wheat starch: from 60 to less than 94.5%, preferably from 70.5 to 90%, and most preferably from 73.5 to 84% by weight, with potato starch being preferred;
(b) native tapioca starch: from more than 3 to no more than 9%, preferably from 4 to 8%, and most preferably from 5 to 7% by weight,
(c) maltodextrin: from 1 to less than 6%, preferably from 2 to 5%, and most preferably from 2 to 4% by weight,
(d) pregelatinized starch: from more than 1.5 to less than 3% by weight, and preferably from 2 to 2.5% by weight,
(e) flavoring and seasoning: from 0 to 15%, preferably from 2 to 14%, and most preferably from 7 to 13% by weight. The percents by weight will total 100%.

In preparing the puffable product, the dry mix is extruded with water in a heated extruder at a rate and temperature such that the mixture exits the extruder as a non-expanded, translucent-to-clear product. The product exiting the extruder is substantially fully cooked. In other words, substantially all the starch granules in the mix have a loss of birefringence and have been substantially gelatinized. The type of extruder used is not critical. Thus, either a single screw or a twin screw extruder may be used. Cooking extruders are generally known in the art. The mixing of the dry mix with the water is carried out in the extruder. The water/dry mix is subjected within the extruder to cooking temperatures, typically within the range of from 140° to 250° F. (i.e., 60° to 121° C.). These temperatures are generally sufficient to allow for plastic flow and substantially gelatinize the starches in the mix. The residence time within the extruder is generally dependent upon the particular extruder as well as the extruder screw profile, temperature, pressure, and shear in the extruder. Typically the residence time will vary from as low as 10 seconds to as high as about one and a half minutes. Useful extruders are described for example in U.S. Pat. Nos. 4,568,550, 3,451,822, and 4,409,250. The product exiting the extruder is nonexpanded, dense and translucent-to-clear, and typically has a shiny, vitreous surface appearance. The amount of water introduced with the mix can vary over a wide range but is generally in the range of from about 13 to about 37% by weight based on the dry mix weight.

Once the product exits the extruder, it is then shaped into any desired geometric form of individual or discrete puffable pieces. Thus the product may be shaped so as to form curls, spheres, stars, ovals, shells, chips, flakes, and the like. The shape may be regular such as pellet shaped, or completely irregular.

After the shaping and/or sizing step, the pieces are adjusted to the suitable moisture, within the range of from 5 to 20% by weight, preferably from 8 to 20% by weight, and most preferably from 10 to 15% by weight. Any method of conventional drying may be used to reduce the moisture content of the pieces. The drying operation may be accomplished using equipment such as rotary bed, tray and belt driers. Simple hot air convention drying is the presently preferred method of drying. It is even possible to allow the pieces to stand at room temperature to attain the desired moisture content.

The non-expanded, translucent-to-clear product may then be stored indefinitely prior to puffing. The puffing step involves subjecting the product to heat. This may be conducted with hot air (e.g., at temperatures of from about 204° C. to 315° C.), deep fat frying, with microwave heating (e.g. in a conventional home microwave oven), or with a puffing gun such as used in puffing cereals. The puffing step typically expands the product from about 6 to as high as 20 times the volume as compared to the volume of the non-expanded, translucent-to-clear product. The expanded product is characterized as having a crunchy texture.

The invention is further illustrated but is not intended to be limited by the following examples in which all parts and percentages are by weight unless otherwise specified.

EXAMPLES

EXAMPLE 1

A formulation consisting of 75 parts by weight of native potato starch, 6 parts by weight of native tapioca starch, 3 parts by weight of a maltodextrin (Maltrin M100, a maltodextrin available from Grain Processing Corporation, having a dextrose equivalent of 10), 2.5 parts by weight of a pregelatinized waxy maize starch (X-Pand'R starch available from A. E. Staley Manufacturing Company), 0.8 parts by weight of sodium chloride, 10 parts by weight of a commercially available seasoning blend (Cheese Popcorn Seasoning, available from Saratoga Specialities), and 2 parts by weight of a natural cheddar cheese flavor powder (R-9440, available from Haarmann & Reimer Corporation) was mixed together in a high speed closed mixer for three minutes. Following mixing, the mixture was placed in a twin-screw feeder apparatus which was positioned over the inlet opening of a twin-screw extruder.

In order to extrude the material, a twin-screw extruder designed by Werner & Pfleiderer Corporation was used. The approximate operating conditions for the Werner & Pfleiderer ZSK-30 extruder were as follows:

| RPM | 105 |
|---|---|
| PSI | 1080 |
| Extruder barrel temperatures | |
| Zone #1 | 34° C. |
| Zone #2 | 101° C. |
| Zone #3 | 41° C. |
| Zone #4 | 52° C. |

The configuration of the screw consisted of the following conveyance screw elements: (the numbers a/b refer to the pitch and length in millimeters) 42/42 for Zone #1: 28/28 and 20/20 screw elements for Zone #2; kneading block 5/20, 20/20 elements and kneading block 5/20 in Zone #3; and, compression elements 14/14 for Zone #4. The die consisted of two 1×6 mm slit openings. The total residence time for the mixture through Zones 1 through 4 was about 70 seconds. The screw configuration allowed for the hydration and heating of the mixture followed by cooking of the starch materials to produce a material that has a loss of birefringence, is fully cooked, and is plastic in flow Zone #4 and exits the die as a dense mass (about 620 g/l) without any evidence of puffing. The material is cut into the desired length at the die face using a conventional cutter assembly.

The extrusion process consisted of adding the dry blend mixture into the screw feeder system. By adjusting the dry feed rate to 6 kg/hr, the water feed rate to the extruder to 2.4 kg/hr and the extruder to the above conditions, an excellent pellet was obtained. The product was air dried (@20°-23° C.). The finished product moisture was between 12 and 14%. Following drying, 30 grams of pellets were placed in a sealable bag especially designed for microwave use. These bags have a susceptor plate on one side and are manufactured by Stone Container Corporation. The bag, containing the pellets, was placed susceptor side down in a household microwave oven having a power output rating of 700 watts. After 1 minute and 30 seconds, the bag was opened and the puffed product was removed. Upon cooling for 30 seconds, a highly expanded textured product having cells of varying sizes was obtained. The product was very flavorful and had excellent melt characteristics when placed in the mouth. The expanded product had a density of about 80 g/l.

EXAMPLE 2

Using the identical process as used in Example 1, three different products were produced. In the first product, 75 parts by weight of native corn starch was substituted for the native potato starch; in the second product, 75 parts by weight of native wheat starch was substituted for the potato starch; while in the third product, 75 parts by weight of native potato starch was again used. The densities of the three, cut, unpuffed products were 647 g/l (corn), 613 g/l (wheat) and 566 g/l (potato). The products had moisture contents of 11.8, 10.0, and 12.1% by weight, respectively. When puffed under identical conditions as used in Example 1, the products had densities of 82.0, 73.6, and 43.1 g/l respectively. The products had expansion ratios of 7.8, 8.3, and 13.1, respectively. From a sensory standpoint, all were acceptable but different with the potato based product providing better texture and melt-in-your-mouth characteristics.

EXAMPLE 3

30 grams of the unpuffed product to Example 1 were placed in the popping compartment of a Wear-Ever hot air popcorn popper. The popping chamber had been warmed for 3 to 5 minutes. Within 30 seconds puffing had begun. At the end of a predetermined time the machine was turned off and the product removed. The process was repeated using time in the hot air chamber as the variable. The following results were obtained:

| TIME (seconds) | DENSITY (g/l) | TEXTURE/SENSORY |
|---|---|---|
| 45 | 150 | hard center |
| 75 | 86 | good expansion, cheddar cheese taste |
| 90 | 80 | good expansion, toasted cheese taste |

The preferred sample was the product that had been heated for 75 seconds. Increasing the sample size decreased the expansion.

EXAMPLE 4

When 50 grams of the unpuffed product of Example 1 was placed in a hot vegetable oil bath (204° C.) for 15 to 30 seconds, a fully puffed edible product was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:
1. A dry mix suitable for the preparation of a puffable food product comprising:
   (a) from 60 to less than 94.5% by weight of a native starch selected from the group consisting of native potato starch, native corn starch, native wheat starch, and mixtures thereof,
   (b) from more than 3 to no more than 9% by weight of native tapioca starch,
   (c) from 1 to less than 6% by weight of a maltodextrin having a dextrose equivalent of 20 or less,
   (d) from more than 1.5 to less than 3% by weight of a modified pregelatinized starch selected from the group consisting of modified pregelatinized grain starch, modified pregelatinized tuber starch, modified pregelatinized root and mixtures thereof,
   (e) from 0 to 15% by weight of a flavoring and/or a seasoning ingredient.
2. The composition of claim 1 further including a flavoring ingredient in an amount sufficient to provide a flavor to the puffed product.

3. The composition of claim 1 wherein said modified pregelatinized starch is selected from the group consisting of modified pregelatinized corn starch, modified pregelatinized waxy maize starch, modified pregelatinized waxy millet starch, modified pregelatinized waxy sorghum starch, modified pregelatinized waxy milo starch, modified pregelatinized waxy rice starch, modified pregelatinized potato starch, modified pregelatinized tapioca starch, and mixtures thereof.

4. The composition of claim 1 wherein said native starch is native potato starch and wherein said modified pregelatinized starch is modified pregelatinized waxy maize starch.

5. The composition of claim 1 wherein the amounts of components are as follows:
  (a) from 70.5 to 90% by weight,
  (b) from 4 to 8% by weight,
  (c) from 2 to 5% by weight,
  (d) from 2 to 2.5% by weight, and
  (e) from 2 to 14% by weight.

6. The composition of claim 5 wherein said amounts are:
  (a) from 73.5 to 84% by weight,
  (b) from 5 to 7% by weight,
  (c) from 2 to 4% by weight,
  (d) from 2 to 2.5% by weight, and
  (e) from 7 to 13% by weight.

7. A process for preparing a puffable food product comprising:
  (I) mixing the following ingredients to form a dry mix:
    (a) from 60 to less than 94.5% by weight of a native starch selected from the group selected from native potato starch, native corn starch, native wheat starch, and mixtures thereof,
    (b) from more than 3 to no more than 9% by weight of native tapioca starch,
    (c) from 1 to less than 6% by weight of a maltodextrin having a dextrose equivalent of 20 or less,
    (d) from more than 1.5 to less than 3% by weight of a modified pregelatinized starch selected from the group consisting of modified pregelatinized grain starch, modified pregelatinized tuber starch, modified pregelatinized root and mixtures thereof,
    (e) from 0 to 15% by weight of a flavoring and/or a seasoning ingredient,
  (II) extruding said mix with water in a heated extruder at a rate and temperature such that the mixture exits the extruder as a non-expanded, translucent-to-clear product,
  (III) cutting the product into the desired shape, and
  (IV) drying the resultant product to a degree such that the moisture content is from 5 to 20% by weight.

8. The process of claim 7 wherein the amounts of components are as follows:
  (a) from 70.5 to 90% by weight,
  (b) from 4 to 8% by weight,
  (c) from 2 to 5% by weight,
  (d) from 2 to 2.5% by weight, and
  (e) from 2 to 14% by weight.

9. The process of claim 8 wherein said amounts are:
  (a) from 73.5 to 84% by weight,
  (b) from 5 to 7% by weight,
  (c) from 2 to 4% by weight,
  (d) from 2 to 2.5% by weight, and
  (e) from 7 to 13% by weight.

10. The process of claim 7 wherein said temperature is in the range of from 60° to 121° C.

11. The process of claim 10 wherein said rate is such that the average residence time is from 10 to 90 seconds.

12. The process of claim 7 wherein said moisture content is from 8 to 20% by weight.

13. The process of claim 11 wherein said moisture content is from 10 to 15% by weight.

14. A puffable product produced by the process of claim 7.

15. A process for preparing a puffed product comprising:
  (I) mixing the following ingredients to form a dry mix:
    (a) from 60 to less than 94.5% by weight of a native starch selected from the group selected from native potato starch, native corn starch, native wheat starch, and mixtures thereof,
    (b) from more than 3 to no more than 9% by weight of native tapioca starch,
    (c) from 1 to less than 6% by weight of a maltodextrin having a dextrose equivalent of 20 or less,
    (d) from more than 1.5 to less than 3% by weight of a modified pregelatinized starch selected from the group consisting of modified pregelatinized grain starch, modified pregelatinized tuber starch, modified pregelatinized root and mixtures thereof,
    (e) from 0 to 15% by weight of a flavoring and/or a seasoning ingredient,
  (II) extruding said mix with water in a heated extruder at a rate and temperature such that the mixture exits the extruder as a non-expanded, translucent-to-clear product,
  (III) cutting the product into the desired shape,
  (IV) drying the resultant product to a degree such that the moisture content is from 5 to 20% by weight, and
  (V) subjecting the dried product to heat to thereby form the puffed product.

16. The process of claim 15 wherein said dried product is heated via hot air at a temperature of from 204° C. to 315° C.

17. The process of claim 15 wherein said dried product is heated via microwave energy.

18. The puffed product produced by the process of claim 15.

* * * * *